US007931005B2

(12) United States Patent
Lemke et al.

(10) Patent No.: US 7,931,005 B2
(45) **Date of Patent: *Apr. 26, 2011**

(54) GENERATING ELECTRICITY WITH A HYPOCYLOIDALLY DRIVEN, OPPOSED PISTON, INTERNAL COMBUSTION ENGINE

(75) Inventors: James U. Lemke, La Jolla, CA (US); William B. McHargue, Cardiff by the Sea, CA (US)

(73) Assignee: Achates Power, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/655,538

(22) Filed: Dec. 31, 2009

(65) Prior Publication Data

US 2010/0109343 A1 May 6, 2010

Related U.S. Application Data

(63) Continuation of application No. 11/725,014, filed on Mar. 16, 2007, now Pat. No. 7,640,910.

(60) Provisional application No. 60/783,372, filed on Mar. 16, 2006.

(51) Int. Cl.
*F02B 75/18* (2006.01)
*F16C 7/00* (2006.01)

(52) U.S. Cl. .................................... 123/197.4; 123/53.6

(58) Field of Classification Search .................. 123/2, 3, 123/197.4, 197.3, 53.3, 53.6, 48 B, 78 E, 123/78 F, 51 AC, 51 AA, 51 BC; 290/1 A, 290/40 R, 40 F See application file for complete search history.

(56) References Cited

U.S. PATENT DOCUMENTS

| | | | | |
|---|---|---|---|---|
| 2,199,625 | A | 5/1940 | Fiala-Fernbrugg | 123/51 |
| 2,332,688 | A | 11/1943 | Norton | 417/324 |
| 3,105,153 | A | 9/1963 | James | 290/1 R |
| 3,234,395 | A | 2/1966 | Colgate | 290/1 R |
| 3,766,399 | A | 10/1973 | Demetrescu | 290/40 R |
| 3,886,805 | A | 6/1975 | Koderman | 74/52 |
| 4,026,252 | A | 5/1977 | Wrin | 123/56 |
| 4,096,763 | A | 6/1978 | Kell | 74/69 |
| 4,154,200 | A | 5/1979 | Jarret et al. | 123/44 R |
| 4,237,741 | A | 12/1980 | Huf et al. | 74/52 |
| 4,300,512 | A | 11/1981 | Franz | 123/536 |
| 4,484,082 | A | 11/1984 | Bucknam | 290/1 R |

(Continued)

FOREIGN PATENT DOCUMENTS

DE 2405542 8/1975

(Continued)

OTHER PUBLICATIONS www.iet.auc.dk/sec2/junkers.htm , Junkers Opposed Piston Two-Stroke Engines for Aircrafts, Automobiles, Combined Heat and Power, pp. 1-20, downloaded Sep. 14, 2006.

(Continued)

*Primary Examiner* — Hai H Huynh

(74) *Attorney, Agent, or Firm* — Terrance A. Meador; INCAPLAW

(57) ABSTRACT

An electrical generator includes an opposed piston, internal-combustion engine with a piston and a hypocycloidal drive connected by a rod to the piston. The construction of the hypocycloidal drive imposes a sinusoidal period on the linear motion of the piston and connecting rod. As generator associated with the piston produces a sinusoidal voltage in response to the liner motion of the piston and connecting rod.

16 Claims, 7 Drawing Sheets

U.S. PATENT DOCUMENTS

| | | | | |
|---|---|---|---|---|
| 4,532,431 | A | 7/1985 | Lliev et al. | 290/4 R |
| 4,631,455 | A | 12/1986 | Taishoff | 38/37 |
| 4,649,283 | A | 3/1987 | Berchowitz et al. | 290/1 R |
| 5,002,020 | A | 3/1991 | Kos | 123/46 E |
| 5,040,502 | A | 8/1991 | Lassiter | 123/197 |
| 5,067,456 | A | 11/1991 | Beachley et al. | 123/197 |
| 5,397,922 | A | 3/1995 | Paul et al. | 290/1 A |
| 5,459,360 | A | 10/1995 | Varo et al. | 310/24 |
| 5,465,648 | A | 11/1995 | Cy | 92/140 |
| 5,727,513 | A | 3/1998 | Fischer | 123/197.4 |
| 5,799,636 | A | 9/1998 | Fish | 123/197.4 |
| 5,951,427 | A | 9/1999 | Schroeder | 475/178 |
| 5,988,121 | A | 11/1999 | Fischer et al. | 123/55.2 |
| 6,012,423 | A | 1/2000 | Fischer | 123/197.4 |
| 6,109,222 | A | 8/2000 | Glezer et al. | 123/46 R |
| 6,318,519 | B1 | 11/2001 | Kruckemeyer et al. | 188/267 |
| 6,318,520 | B1 | 11/2001 | Lisenker et al. | 188/267 |
| 6,464,049 | B2 | 10/2002 | Lisenker | 188/267 |
| 6,484,498 | B1 | 11/2002 | Bonar, II | 60/517 |
| 6,510,831 | B2 | 1/2003 | Wiseman | 123/197.4 |
| 6,526,935 | B2 | 3/2003 | Shaw | 123/197.4 |
| 6,532,916 | B2 | 3/2003 | Kerrebrock | 123/46 E |
| 6,541,875 | B1 | 4/2003 | Berlinger et al. | 290/1 R |
| 6,707,175 | B2 | 3/2004 | Rigazzi | 310/23 |
| 6,742,482 | B2 | 6/2004 | Artola | 123/71 R |
| 6,748,907 | B2 | 6/2004 | Malmquist et al. | 123/46 E |
| 6,932,030 | B2 | 8/2005 | Perlo et al. | 123/46 R |
| 6,945,202 | B2 | 9/2005 | Kaneko et al. | 123/46 R |
| 7,318,506 | B1 | 1/2008 | Meic | 290/1 A |
| 7,360,511 | B2 | 4/2008 | Lemke et al. | 123/41.35 |
| 7,640,910 | B2 * | 1/2010 | Lemke et al. | 123/197.4 |
| 2006/0101816 | A1 | 5/2006 | Klostemann | 60/508 |
| 2006/0130782 | A1 | 6/2006 | Boland | 123/55.2 |
| 2007/0215093 | A1 | 9/2007 | Lemke et al. | 123/197.4 |
| 2010/0031916 | A1 * | 2/2010 | Wiseman | 123/197.1 |

FOREIGN PATENT DOCUMENTS

| | | |
|---|---|---|
| WO | WO 01/06092 | 1/2001 |
| WO | WO 2006/102314 | 9/2006 |

OTHER PUBLICATIONS www.randomron.com/cycloid.htm, Matthew Murray Steam Powered Hypocycloidal Pumping Engine, pp. 1-4, downloaded Mar. 14, 2007.

Bruce Engineering Model Engineers' Supplies, *Murray's Hypocycloidal Engine*, pp. 14-15, Oct. 2006.

ANSI/AGMA 1012-G05, Gear Nomenclature, Definition of Terms with Symbols, Definition 4.5.3.1.1 "Pitch Cylinder", p. 10, © AGMA 2005.

Willard W. Pulkrabek, *Engineering Fundamentals of the Internal Combustion Engine*, 2nd Edition, © 2004, 1997. pp. 8, 10, 11.

http://en.wikipedia.org/wiki/Opposed_piston_engine, Opposed Piston Engine, pp. 1-4, downloaded Dec. 30, 2009.

* cited by examiner

GENERATING ELECTRICITY WITH A HYPOCYLOIDALLY DRIVEN, OPPOSED PISTON, INTERNAL COMBUSTION ENGINE

PRIORITY

This application is a continuation of U.S. patent application Ser. No. 11/725,014, filed Mar. 16, 2007, which claims benefit of priority under 35 USC §119 to U.S. provisional application for patent 60/783,372, filed Mar. 16, 2006.

RELATED APPLICATIONS

The following co-pending applications, all owned by the assignee of this application, contain subject matter related to the subject matter of this application:

U.S. patent application Ser. No. 10/865,707, filed Jun. 10, 2004 for "Two Cycle, Opposed Piston Internal Combustion Engine", published as US/2005/0274332 on Dec. 29, 2005, now U.S. Pat. No. 7,156,056, issued Jan. 2, 2007;

PCT application US2005/020553, filed Jun. 10, 2005 for "Improved Two Cycle, Opposed Piston Internal Combustion Engine", published as WO/2005/124124 on Dec. 15, 2005;

U.S. patent application Ser. No. 11/095,250, filed Mar. 31, 2005 for "Opposed Piston, Homogeneous Charge, Pilot Ignition Engine", published as US/2006/0219213 on Oct. 5, 2006;

PCT application US2006/011886, filed Mar. 30, 2006 for "Opposed Piston, Homogeneous Charge, Pilot Ignition Engine", published as WO/2006/105390 on Oct. 5, 2006;

U.S. patent application Ser. No. 11/097,909, filed Apr. 1, 2005 for "Common Rail Fuel Injection System With Accumulator Injectors", published as US/2006/0219220 on Oct. 5, 2006;

PCT application US2006/012353, filed Mar. 30, 2006 "Common Rail Fuel Injection System With Accumulator. Injectors", published as WO/2006/107892 on Oct. 12, 2006;

U.S. patent application Ser. No. 11/378,959, filed Mar. 17, 2006 for "Opposed Piston Engine", published as US/2006/0157003 on Jul. 20, 2006;

U.S. patent application Ser. No. 11/512,942, filed Aug. 29, 2006, for "Two Stroke, Opposed Piston Internal Combustion Engine", divisional of Ser. No. 10/865,707;

U.S. patent application Ser. No. 11/629,136, filed Dec. 8, 2006, for "Improved Two Cycle, Opposed Piston Internal Combustion Engine", CIP of Ser. No. 10/865,707; and U.S. patent application Ser. No. 11/642,140, filed Dec. 20, 2006, for "Two Cycle, Opposed Piston Internal Combustion Engine", continuation of Ser. No. 10/865,707.

BACKGROUND

The field covers the combination of an opposed-piston engine with a hypocycloidal drive. In particular, the field covers the use of a piston coupled to a hypocycloidal drive to generate electrical power.

The opposed piston internal-combustion engine was invented by Hugo Junkers around the end of the nineteenth century. In Junkers' basic configuration, two pistons are disposed crown-to-crown in a common cylinder having inlet and exhaust ports near bottom dead center of each piston, with the pistons serving as the valves for the ports. The engine has two crankshafts, each disposed at a respective end of the cylinder. The crankshafts are linked by rods to respective pistons and are geared together to control phasing of the ports and to provide engine output. The advantages of Junkers' opposed piston engine over traditional two-cycle and four-cycle engines include superior scavenging, reduced parts count and increased reliability, high thermal efficiency and high power density.

Nevertheless, Junkers' basic design contains a number of deficiencies among which is excessive friction, between the pistons and cylinder bore caused by side forces exerted on the pistons. Each piston is coupled by an associated connecting rod to one of the crankshafts. Each connecting rod is connected at one end to a piston by a wristpin internal to the piston; at the other end, the connecting rod engages a crankpin on a crankshaft. The connecting rod pivots on the wristpin in order to accommodate circular motion of the crank pin. As the connecting rod pushes the piston inwardly in the cylinder, it exerts a compressive force on the piston at an angle to the axis of the piston, which produces a radially-directed force (a side force) between the piston and cylinder bore. This side force increases piston/cylinder friction, raising the piston temperature and thereby limiting the brake mean effective pressure (BMEP) achievable by the engine.

An engine coupling invented by Mathew Murray in 1802 converted the linear motion of a steam engine piston and rod into rotary motion to drive a crankshaft by a "hypocycloidal" gear train coupling the rod to the crankshaft. A hypocycloid is a special plane curve generated by the trace of a fixed point on a small circle that rolls within a larger circle. In Murray's gear train, the larger circle is the "pitch circle" of a ring gear with teeth on an inner annulus and the small circle is the pitch circle of a spur gear with teeth on an outer annulus. (See the definition of "pitch circle" in American National Standard publication ANSI/AGMA 1012-G05 at 4.5.3.1.1, page 10). The spur gear is disposed within the ring gear, with its teeth meshed with the teeth of the ring gear. As the spur gear rotates, it travels an orbit on the inner annulus of the ring gear. Murray's gear train represents a special hypocycloid in which the pitch diameter (D) of the ring gear's pitch circle is twice the pitch diameter (d) of the spur gear's pitch circle. When D=2d, a point on the spur gear pitch circle moves in a straight line along a corresponding pitch diameter of the ring gear as the spur gear orbits within the ring gear. Murray connected one such point to a piston rod; the linear motion of the piston rod caused the spur gear to revolve within the ring gear, and the gear train converted the piston's linear motion to rotary motion.

Cycloidal gear arrangements have been used in numerous internal combustion engine configurations, including opposed piston engines. See U.S. Pat. No. 2,199,625, for example. In the engine disclosed in the '625 patent, opposed pistons are coupled to cycloid crank drives by means of connecting rods. However, the '625 patent omits two critical insights in this regard.

First, the plane curve traced by the spur gear is not linear in any embodiment taught in the '625 patent: thus, connecting rod motion is not linear. In fact, each connecting rod conventionally engages a wristpin internal to a piston, which allows the connecting rod to pivot with respect to the axis of the piston in order to accommodate the non-linear plane curves traced by the spur gear. Consequently, as the connecting rod pivots on a return stroke while moving a piston into a cylinder, it imposes side forces on the piston, which causes friction between the piston and cylinder bore.

Thus, an unrealized advantage of coupling the pistons of an opposed piston engine to hypocycloidal drives in which the ratio between the pitch diameters of the ring and spur gears is 2:1 is that the pistons, and their connecting rods, undergo purely linear movement along a common axis, thereby eliminating radially-directed side forces that cause friction between the pistons and the bore of the cylinder in which they are disposed.

The '625 patent does indicate that grafting a hypocycloidal output to an opposed piston engine construction can add a dimension of flexibility to engine design and operation. For example, the ratio between the pitch diameters is varied to accommodate piston strokes of varying length, which, according to the patent, can be tailored to improve scavenging and piston cooling. However, the '625 patent omits the case where D=2d, in which the linear motion of the spur gear is sinusoidal. The '625 patent therefore lacks a second critical insight: the sinusoidal characteristic of the resulting linear motion can support useful adaptations of a hypocycloidally-coupled engine to produce a desirable sinusoidal output. For example, an internal-combustion engine may be adapted to generate AC electrical power by mounting a coil to the skirt of a piston and coupling the piston to a hypocycloidal drive in which D=2d. The action of the hypocycloidal drive imposes a sinusoidal period on the straight linear motion of the piston. As the piston transports the coil though a magnetic field, a sinusoidal voltage is induced in the windings of the coil.

SUMMARY

A hypocycloidal drive includes a pair of spaced-apart ring gears with equal pitch diameters D, a pair of pinions with equal pitch diameters d, wherein D=2d, each pinion engaging a respective ring gear, a journal mounted between the pinions such that the journal axis coincides with the pitch diameters of the pinions, and a respective journal rotatably mounted to an outside of each pinion.

An opposed piston, internal-combustion engine is provided with a hypocycloidal drive to convert the linear motion of the pistons and associated connecting rods to rotary output motion. More specifically, in an engine including a cylinder with a bore and opposed pistons disposed within the bore, each connecting rod is coupled to a journal of the hypocycloidal drive.

An electrical generator includes an internal-combustion engine with a coil mounted to the skirt of a piston and a hypocycloidal drive connected by a connecting rod to the piston. The action of the hypocycloidal drive imposes a sinusoidal period on the straight linear motion of the piston. As the piston transports the coil though a magnetic field, a sinusoidal voltage is induced in the windings of the coil.

BRIEF DESCRIPTION OF THE DRAWINGS

The below-described figures are meant to illustrate principles and examples discussed in the following detailed description. They are not necessarily to scale.

DETAILED DESCRIPTION OF PREFERRED EMBODIMENTS

Figure 1:
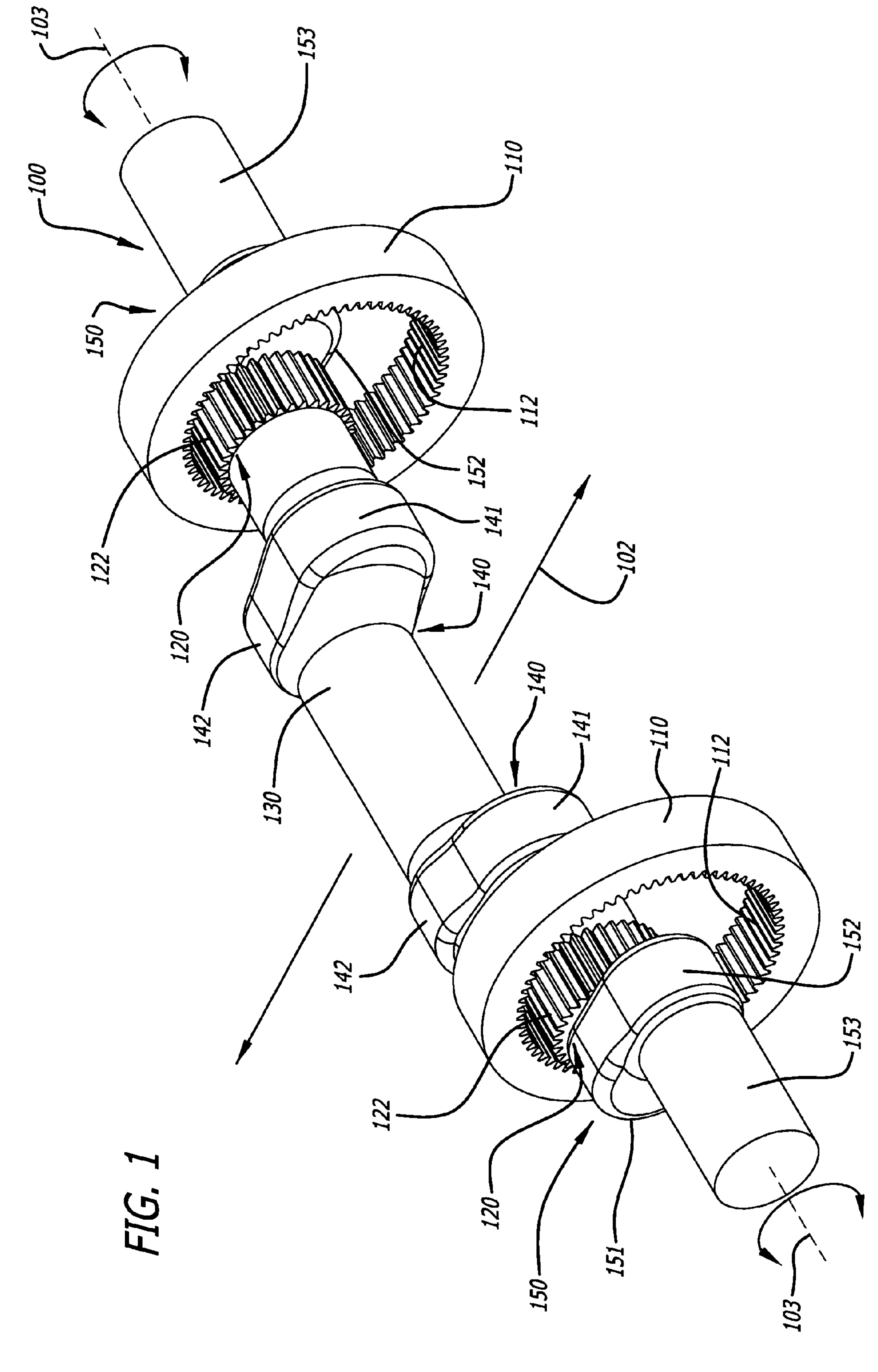
FIG. 1 is a perspective view of a hypocycloidal drive for an opposed piston engine.

A hypocycloidal drive illustrated in FIG. 1 translates reciprocating linear motion along a line 102 into rotary motion on an axis 103. The drive 100 includes spaced-apart ring gears 110 and coaxially-aligned, spaced-apart spur gears (hereinafter, "pinions") 120. The ring gears are fixed and share the axis 103. Each ring gear 110 has gear teeth 112 on an inside annulus, and each pinion 120 has gear teeth 122 on an outside annulus. The pinions 120 are disposed within the ring gears 110 such that the gear teeth 122 of each pinion 120 are engaged with the gear teeth 112 of a respective ring gear 110.

Conventional means (not shown) are used to maintain each pinion 120 for rotation on the inside annulus of a ring gear 110 so that, as the pinion rotates, it is constrained to travel a circular path along the inside annulus. Such means may comprise a frame holding a ring gear 110 and retaining a first disc concentrically with the ring gear in a bearing that permits the disc to rotate in a plane parallel to a plane in which the ring gear 110 is supported. A pinion 120 is mounted to a second disc, smaller than the first disc that is, in turn, rotationally supported by a bearing in an aperture of the first disc. The pinion 120 orbits along the gear teeth 112, rotating freely on the bearing supporting the second disc. The first disc rotates in response to movement of the pinion 120, and retains the pinion 120 against the gear teeth 112.

Each of the ring gears and pinions has a respective pitch diameter. Preferably, the pitch diameters (D) of the ring gears are equal; the pitch diameters (d) of the pinions are equal; and, D=2d. Thus, any point on a pinion's pitch circle will follow a straight line of motion as the pinion 120 rotates around the inside annulus of a ring gear 110. As in FIG. 1, the pinions 120 are disposed concentrically. Thus, when the pinions 120 rotate at the same speed they maintain concentricity as they move. A line joining corresponding points on the pinion pitch circles that moves in a plane also containing the linear motion of a piston (not shown) establishes an axis of rotation for a journal coupled to a connecting rod running between the piston and the journal. For example, in FIG. 1 a journal 130 is disposed coaxially with such an axis of rotation. When supported in a bearing of a connecting rod-moving along the path 102, the journal 130 rotates as it moves, and the rotation of the journal 130 is imparted to the pinions 120.

FIG. 1 illustrates an exemplary construction for mounting the journal 130 to the pinions 120; this construction is not intended to exclude equivalent constructions that make the journal axis coincident with the pitch diameters of the pinions that lie in the plane containing the linear path 102. In FIG. 1, each pinion 120 has a first side that faces inwardly, toward the first side of the other pinion, and a second side that faces outwardly, away from the other pinion 120. An eccentric member 140 is mounted to each pinion 120. Each eccentric member 140 has a first end 141 and a second end 142. The first end 141 is coaxial with and fixed to the inside of the pinion 120; the second end 142 is fixed to the journal 130.

Per FIG. 1, output rotary motion is provided by the hypocycloidal drive 100 by eccentric members 150 rotatably mounted to the pinions 120. Each eccentric member 150 has a first end 151 and a second end 152. The first end 151 of each eccentric 150 is mounted to a pinion 120 to rotate on the axis thereof; a rotatable connection between the first end 151 and pinion 120 may be by means of a journal and a bearing (neither seen in FIG. 1). A journal 153 is fixed to the second end 152 of each eccentric member 150. The journals 153 are coaxial with the common axis 103 of the ring gears 110.

With further reference to FIG. 1, the hypocycloidal drive 100 operates in response to reciprocating piston motion coupled by a connecting rod (not shown) moving linearly along the line 102 by translating that linear movement to rotary output movement on the axis 103. The movement of the connecting rod along the line 102 causes the journal 130 to move back and forth along the same line 102, rotating on its axis as it travels. The movement of the journal 130 is coupled by the eccentric members 140 to the pinions 120, causing the pinions to rotate in the same direction, on a common axis. As the pinions rotate, they orbit on parallel, concentric circular paths defined by the radial separation of their common axis from the axis 103. The orbit of each pinion axis is coupled by an eccentric member 150 to a journal 153, and the journals 153 rotate on the axis 103.

Figure 2A:
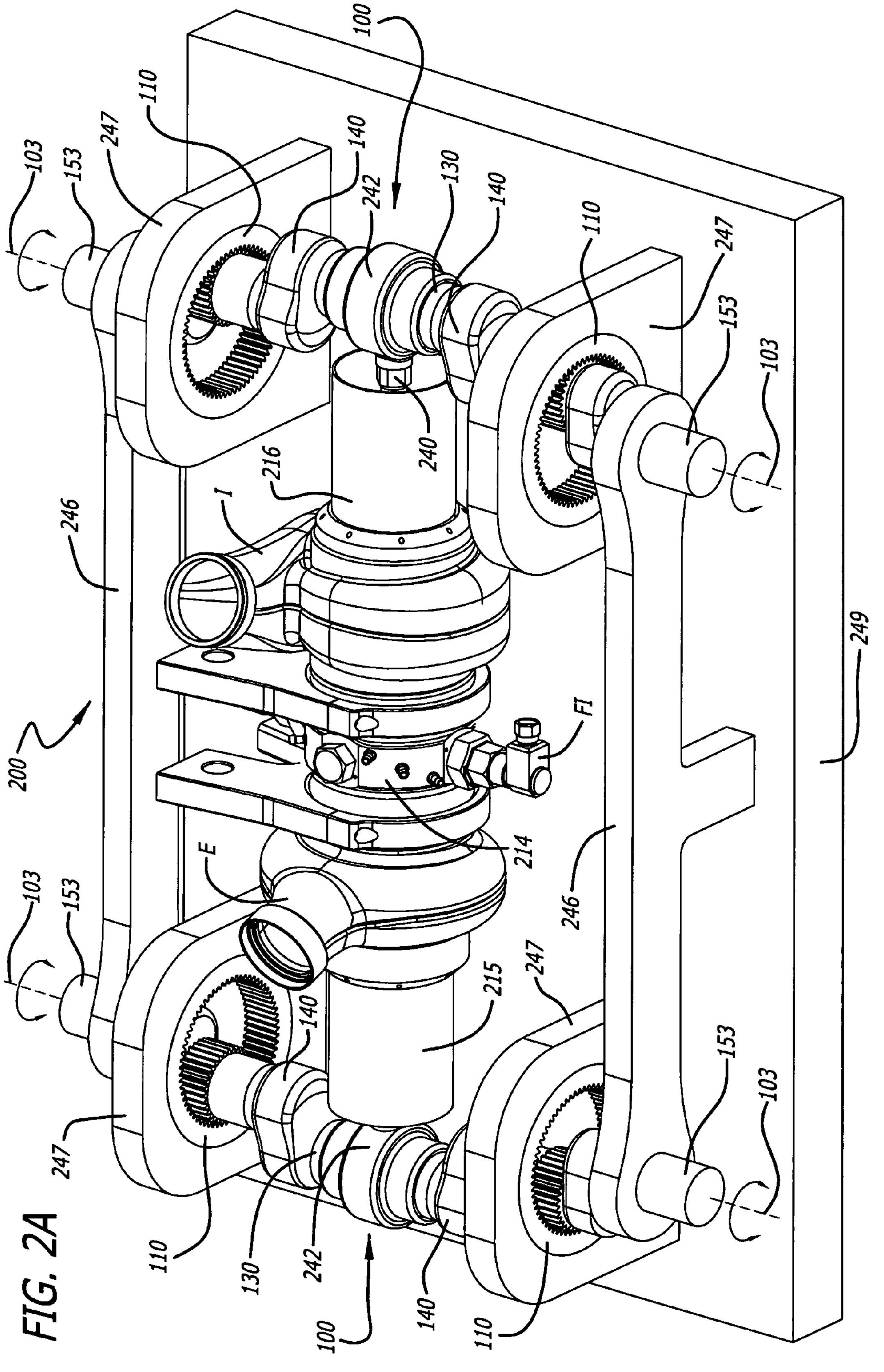
FIG. 2A is a perspective view of an opposed piston, internal-combustion engine with hypocycloidal drives in which the pistons are near bottom dead center positions.
Figure 2B:
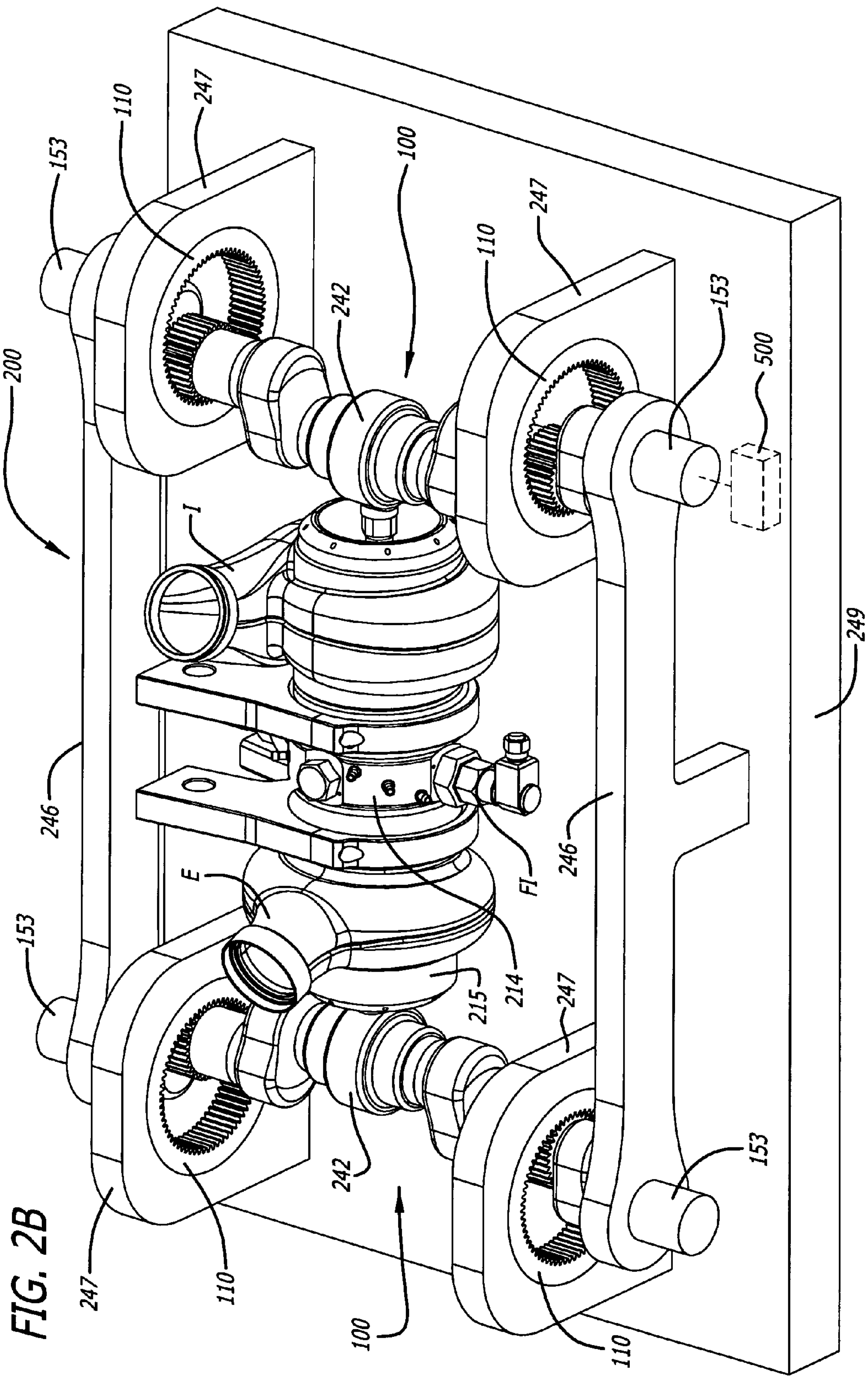
FIG. 2B is a perspective view of the opposed piston engine of FIG. 2A in which the pistons are near top dead center positions.
Figure 3:
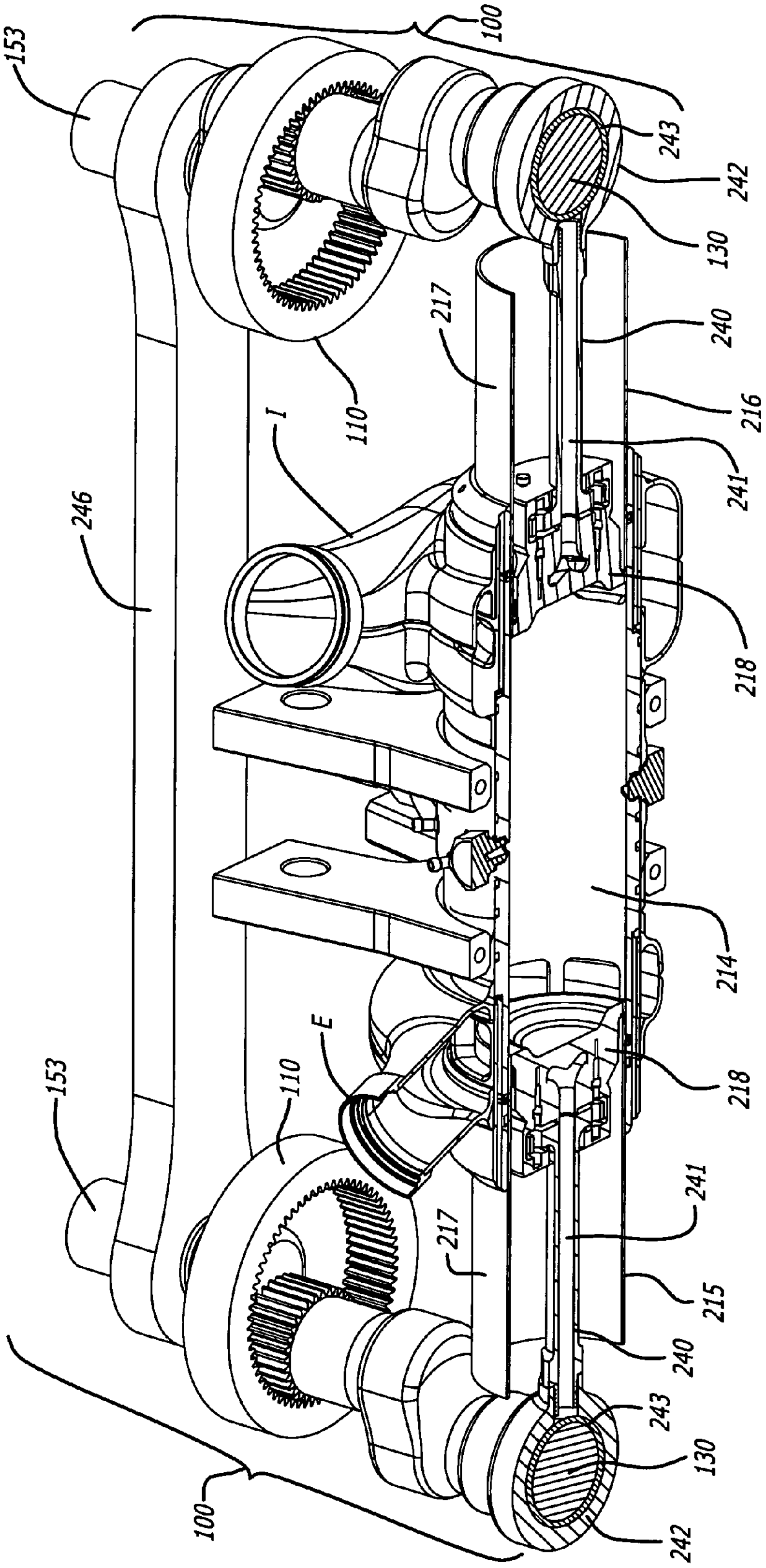
FIG. 3 is a side section view of the opposed piston, internal-combustion engine of FIGS. 2A and 2B.

A module of an opposed piston internal-combustion engine 200 with hypocycloidal drives is shown in FIGS. 2A, 2B and 3. The module represents the basic unit of an engine, with the understanding that the illustrated unit would be connected by appropriate means to engine control, air, fuel and coolant systems. The unit may also be supported with other identical units in a multi-cylinder engine. The engine 200 includes a cylinder 214 in which two pistons 215 and 216 are disposed. Examples of construction and operation of cylinders and pistons which may be incorporated into the engine 200 may be found in publication WO 2005/124124 A1, which is incorporated herein by reference. One or more fuel injectors FI mounted to the cylinder 214 inject fuel, typically diesel fuel, into the cylinder, between the crowns of the pistons 215, 216.

As best seen in FIG. 3, the pistons 215 and 216 are disposed crown-to-crown in the bore of the cylinder 214 in opposing axial alignment, and reciprocate toward and away from each other as the engine 200 operates. Each of the pistons 215, 216 has a skirt 217 and a crown 218. The structure of the cylinder 214 includes exhaust and intake ports E, I. Air introduced through port I is compressed as the pistons move together. Then, fuel injected into the compressed air ignites, driving the pistons apart. Exhaust gases exit the cylinder through port E. Each piston moves in a reciprocating straight line motion within the bore of the cylinder 214 during each operating cycle of the engine 200. In FIG. 2A, the pistons 215 and 216 have moved away from each other, and are traversing their respective bottom dead center positions; in FIG. 2B, the pistons have moved toward each other, while traversing through their respective top dead center positions. The operational cycle of an opposed piston engine is described in publication WO 2005/124124 A1.

With further reference to FIGS. 2A and 2B, the engine 200 includes hypocycloidal drives near respective ends of the cylinder 214. For example, but without excluding other hypocycloidal constructions, each of the hypocycloidal drives in FIGS. 2A and 2B may be constituted as the hypocycloidal drive 100 illustrated in FIG. 1, with the numbering convention of that example used for ease of explanation and illustration throughout the remainder of the description. Each hypocycloidal drive 100 converts the reciprocating straight line motion of a piston into a rotary output motion. In FIG. 3, each of the pistons 215, 216 is coupled to an associated hypocycloidal drive 100 by a connecting rod 240. Each connecting rod 240 is attached at one end to the crown of a piston and is coupled at the opposite end to a journal 130 of a hypocycloidal drive 100. As best seen in FIG. 3, with the hypocycloidal drive 100 of FIG. 1 as the example, the end of the connecting rod 240 nearest a journal 130 has a support structure 242 mounted thereto. A bearing 243 rotatably supports the journal 130 in the support structure 242.

In FIGS. 2A and 2B, tie rods 246 hold the engine 200 together. Each tie rod 246 has two bearings, one at either end, to receive and support two journals 153 of two respective hypocycloidal drives 100 for rotation. Bearing supports 247 support the ring gears 110 at fixed locations in the engine 200. Both the tie rods 246 and the bearing supports 247 are shown mounted to a structural member 249, of an engine frame, for example. The hypocycloidal drives 100 represent modular portions of respective crankshafts, each disposed at a respective end of the cylinder 214. Such crankshafts may be supported for rotation relative to each other in either direction. Each journal 130 of a hypocycloidal drive also functions as a crankpin for a respective one of the crankshafts, and the journals 153 correspond to the central shaft of a crankshaft from which output rotary motion of the engine 200 is captured by interconnecting gears between the crankshafts. These interconnecting gears are not seen in the figures, but may be understood by reference to the example shown in publication WO 2005/124124 A1, referenced above. If the pitch diameters specified above (D=2d) for the ring and pinion gears are utilized, the reciprocating straight-line motion of each of the pistons 215, 216 is translated, by a hypocycloid drive 100 coupled to the piston, into rotary motion of a respective crankshaft in which the crankshaft rotates 360° for every complete operational cycle of the piston. With D=2d, the connecting rods 240 undergo purely linear motion, no side forces are generated, and wristpins internal to the pistons may be omitted in the construction of the engine 200.

As can further be seen in FIG. 3, channels 241 inside the connecting rods 240 may be provided to deliver liquid coolant, as needed, to back surfaces of the piston crowns 218. The channels 241 may communicate with liquid lines through elements (not shown) of the hypocycloidal drive 100 where fluid, for example diesel fuel under pressure, may be injected. Liquid coolant may be applied to the pistons 215, 216 and to the cylinder 214 in the manner taught in PCT patent publication WO 2005/124124 A1. Liquid coolant may also be applied to the pistons 215, 216 as disclosed below.

Figure 4:
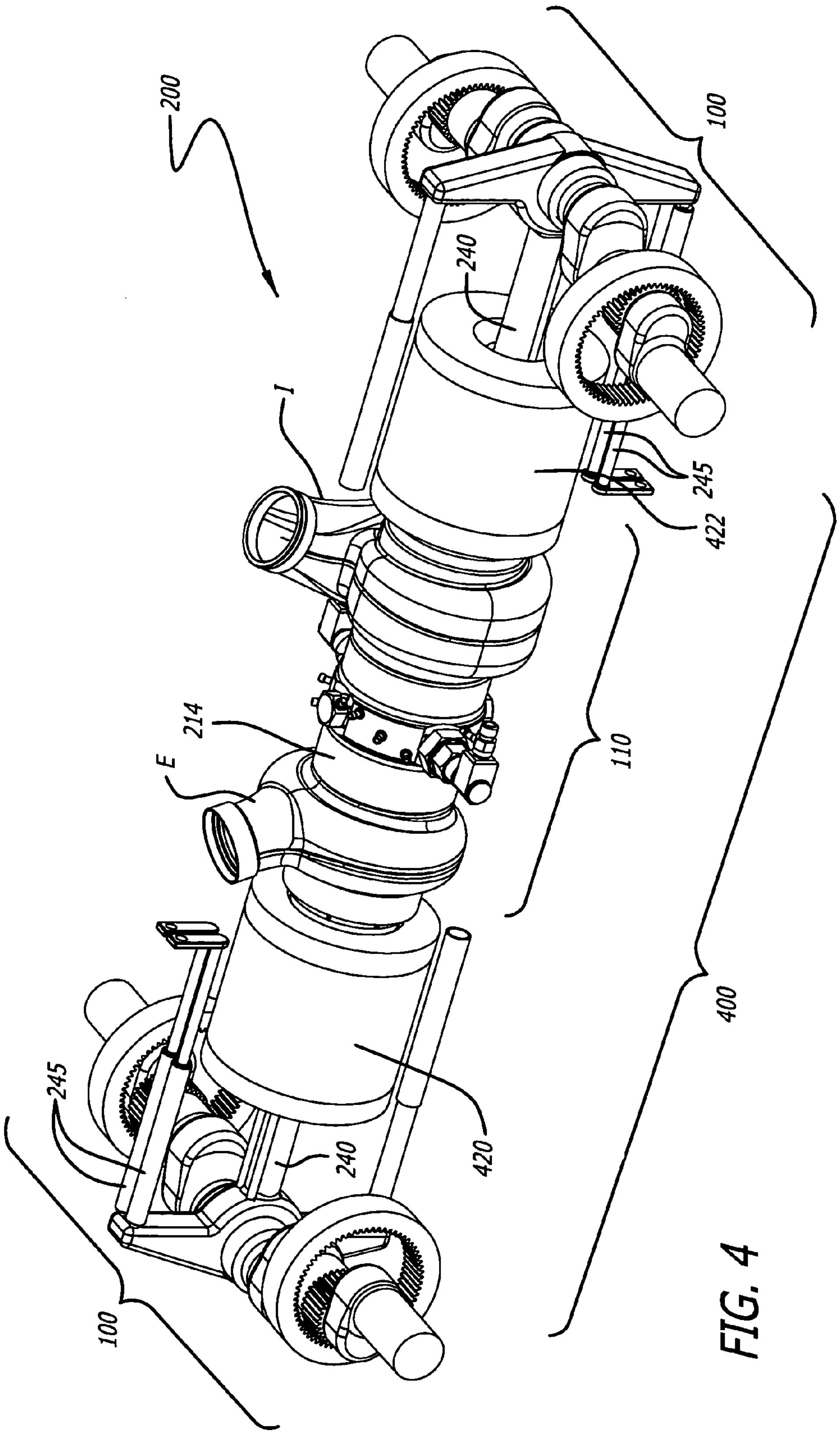
FIG. 4 is a perspective view of a generator apparatus constituted of an opposed piston internal-combustion engine with hypocycloidal drives and having at least one generator.

As best seen in FIG. 4, a generator apparatus 400 for converting mechanical to electrical energy includes a two-cycle, opposed piston internal-combustion engine with hypocycloidal drives. For example, but without excluding other hypocycloidal structures and/or opposed piston structures, each of the hypocycloidal drives and the engine in FIG. 4 may be constituted as illustrated in FIG. 1 and FIGS. 2A, 2B, and 3 and the numbering convention of those examples will be used for ease of explanation and illustration throughout the remainder of the description. Thus, the generator apparatus 400 may be constituted of an engine 200 with hypocycloidal drives 100 in which D=2d, with the engine adapted, as to be described, for generating electricity. The engine 200 includes one or more cylinders, including the cylinder 214. Two opposed pistons (not seen in FIG. 4) are disposed for reciprocal motion in the bore of the cylinder 214. A hypocycloidal drive 100 is coupled to each of the pistons disposed in the cylinder 214. Piston rods 240 couple the pistons to the hypocycloidal drives 100. The generator apparatus 400 may include at least one generator for converting the motion of a piston into electricity. For example, the generator apparatus 400 includes two generators 420, each associated with a respective piston, and each located at a respective end of the cylinder 214.

Figure 5:
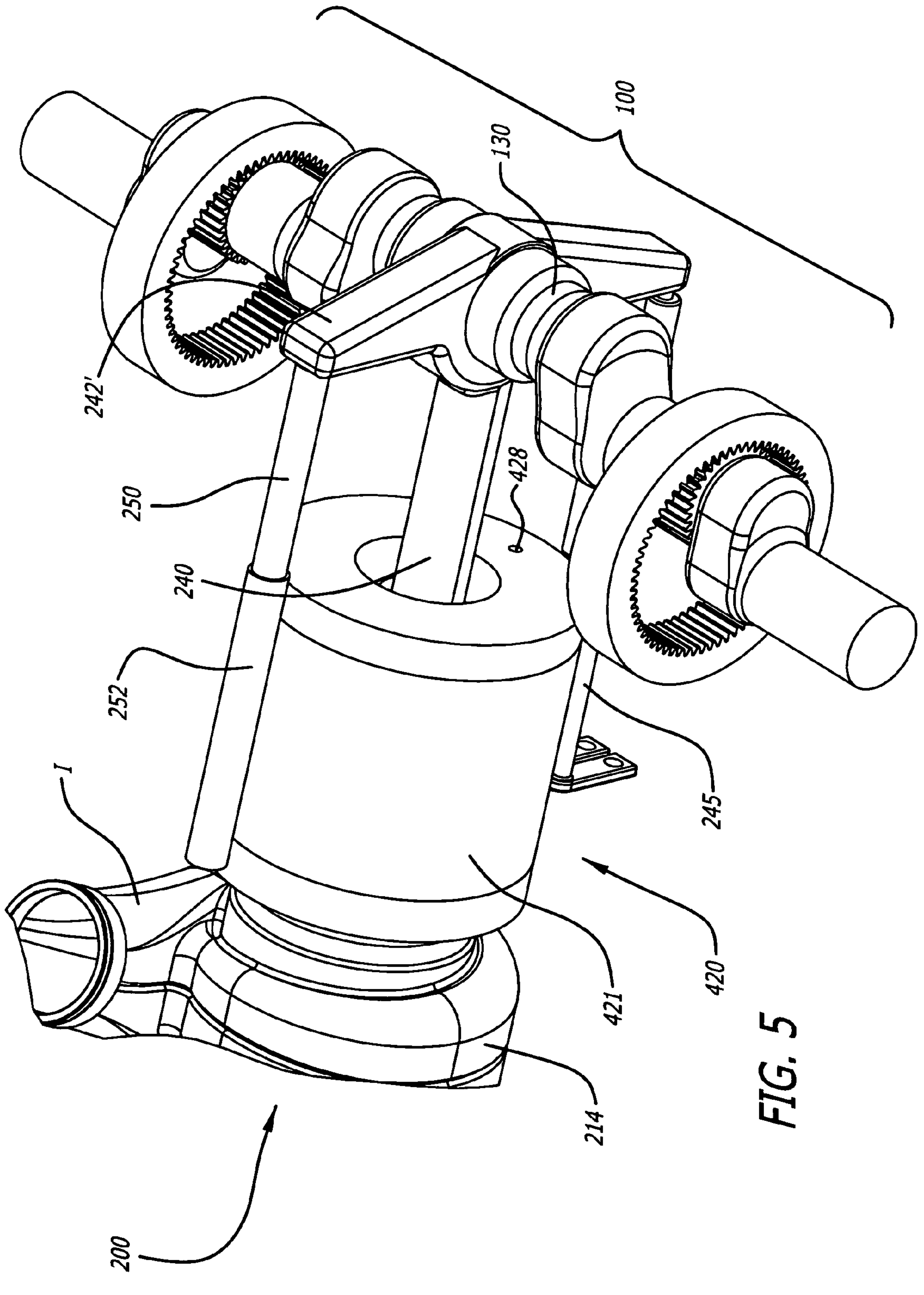
FIG. 5 is a perspective view of one side of the generator apparatus of FIG. 4.
Figure 6:
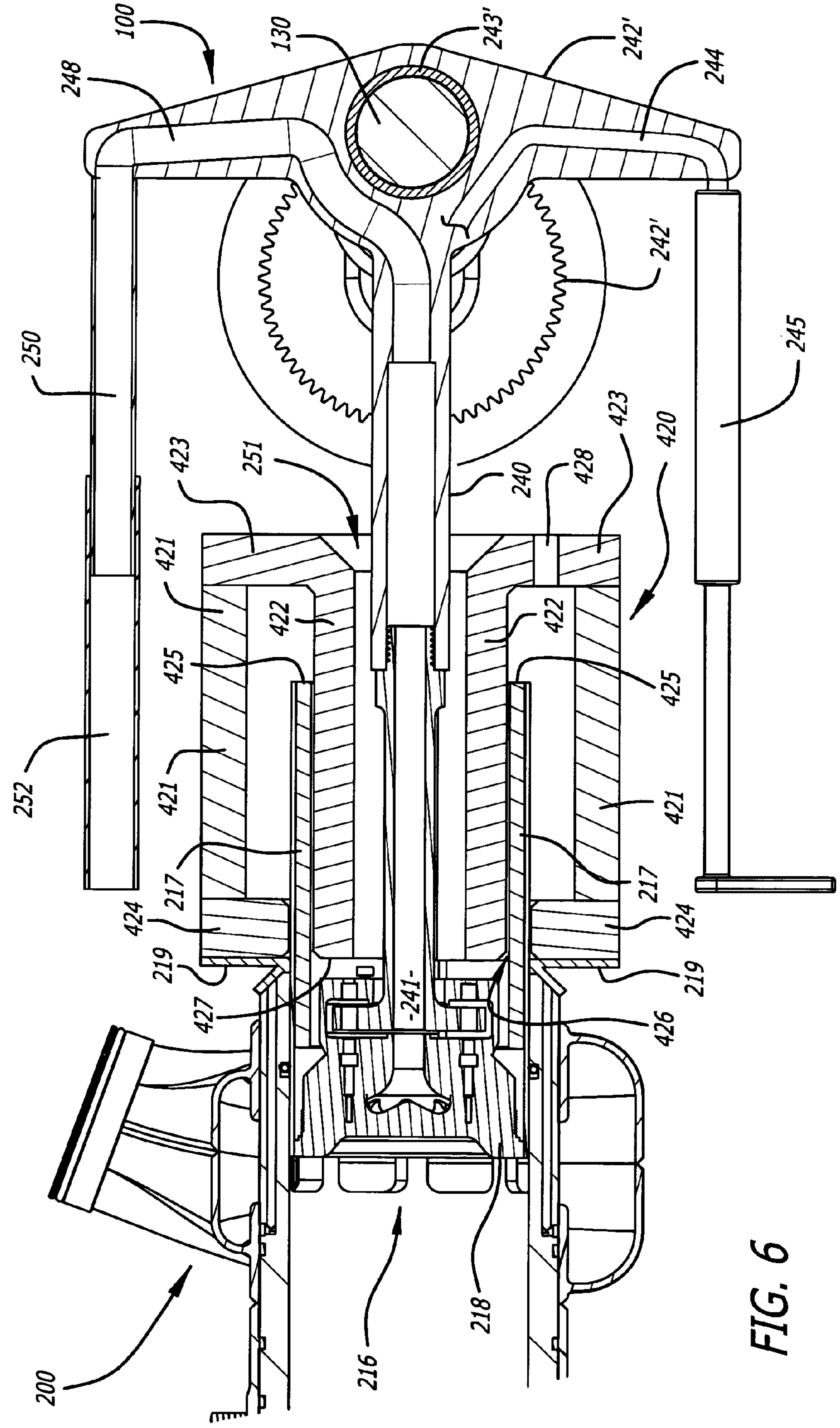
FIG. 6 is an enlarged cross section of the side shown in FIG. 5.

FIG. 5 is a side perspective view of the right hand side of the generator apparatus 400, and FIG. 6 illustrates a cross section of that side. As seen in FIG. 6, the right hand side includes one piston 216, with the understanding that the salient features of the piston 216 and associated structures may also be included in the construction of the left hand side of the generator apparatus 400, which is not seen in FIGS. 5 and 6. As seen in FIGS. 5 and 6, the generator 420 associated with the piston 216 includes a magnetic circuit including a permanent magnet 421, a cylindrical piece 422 with a flange 423, and an annular disc 424. The cylindrical piece 422 and the annular disc 424 are made of magnetically conductive material such as cold rolled steel. The annular disc 424 is fixed to the cylinder 214 by attachment to a flange 219 formed on the end of the cylinder 214, and the magnet 421 is held between the annular disc 424 and the flange 423. The elements of the magnetic circuit may be bonded together. Since side forces causing friction between the pistons and the bore of the cylinder are eliminated by hypocycloidal coupling in which D=2d, piston construction can incorporate light, non-magnetic materials. For example, the skirt 217 of the piston 216 may be made of a boron fiber, Kevlar, or other suitable or equivalent composite material, and the outer surface of the skirt 217 may be coated with a diamond-like material for hardness and durability. The generator 420 includes a coil 425 of conductive wire, preferably copper wire, disposed on the inside surface of the skirt 217. An air gap 426 suitable to accommodate the aggregate thickness of the coil 425 and piston skirt 217 is provided between the annular disc 424 and the upper end 427 of the cylindrical piece 421. One of the connecting rods 240 is attached at one end to the crown 218 of the piston 216 and at the opposite end to the journal 130 of a hypocycloidal drive 100 by means of a support structure 242'. The support structure 242' includes a bearing 243' that receives and supports the journal 130 for rotation.

As the piston 216 reciprocates within the cylinder 214 of the opposed piston engine 200, the skirt 217 moves through a magnetic field created by the permanent magnet 421. During this reciprocating action of the skirt 217, the coil 425 continuously traverses the magnetic field, which induces a voltage in the windings of the coil 425. The voltage ("E") created by the coil 425 is a function of the strength of the magnetic field ("B") times the length of the wire wound on the coil 425 ("l") actually in the magnetic field times the velocity of the coil passing through the magnetic field ("v") and is expressed as E=Blv. Conventional wire forming processes can yield a large value for "l" in a relatively short coil.

Referring again to both FIG. 5 and FIG. 6, if the pitch diameters of the ring gears and pinions of the hypocycloidal drives 100 are constrained by D=2d, each hypocycloidal drive 100 will impose a sinusoidal characteristic on the reciprocal straight line motion of a piston. This is especially advantageous in the generator apparatus 400 because the sinusoidal characteristic will be imposed on the voltage generated by the reciprocating coil 425 as it is carried by the piston 216 through the magnetic field. In conventional rotating generators, hysteresis and eddy current losses are caused by the constant variation of the magnetic flux as the armature core rotates through the polarized fields. These losses are minimal, if not absent, in the generator 420 because the flux is relatively constant within the magnetic circuit. Furthermore, with a sinusoidal linear motion generating a corresponding sinusoidal voltage there is no need for inverters to generate alternating voltage outputs. In addition, a purely (or nearly pure) sinusoidal characteristic may be achieved for the linear motion of the pistons and, consequently, the voltage, with addition of one or more suitable flywheels mounted or coupled to the crankshafts. For example, with the engine 200 operating at 3600 RPM, and variations in the rotational speed of the crankshafts eliminated by one or more flywheels, each of the generators 420 can produce pure sinusoidal 120 VAC. An ancillary coil, not shown, may be mounted within the magnetic circuit to provide regulation of the voltage produced by the generator 420.

As can further be seen in FIG. 6, the channel 241 inside the connecting rod 240 communicates with a channel 248 in the support structure 242'. A piston cooling liquid line 250 attached to the support structure 242' in communication with the channel 248 has a reciprocating sliding engagement with a stationary coolant supply pipe 252 where liquid coolant, for example diesel fuel, under pressure is injected as needed to cool back surfaces of the piston crown 218. As the engine 200 operates, the coolant effluent from the inside surface of the crown 218 flows along the inside surface of the skirt 217, cooling the coil, and exits through the channel 251 formed by the cylindrical piece 422. A drain hole 428 through the flange 423 allows coolant to drain from the cylindrical space between the cylindrical piece 422 and the permanent magnet 421. Although FIG. 6 shows the line 250 moving within the piston coolant liquid line 252, a preferred embodiment would have the line 250 moving outside the piston coolant supply pipe 252 to reduce liquid leakage along the outer surface of the extension of the line 250. A second channel 244 within the connecting rod 240 brings conductors from the voltage generating coil 425 to make contact with a pair of fixed brushes (not shown) within a pair of housings 245 to provide an output source for the generated voltage.

As per FIG. 2B, an alternate apparatus for generating electrical energy may include conventional alternators 500 coupled to journals 153 with a light timing belt to maintain synchrony between the two pistons while, electrical power is provided by the alternators 500.

Although novel principles have been set forth with reference to specific embodiments described hereinabove, it should be understood that modifications can be made without departing from the spirit of these principles. For example, the opposed pistons described above may be coupled to a hypocycloidal drive constituted of a single ring gear engaged by a single pinion, with D=2d, like Murray's gear train. Thus, the scope of patent protection for an opposed piston internal-combustion engine with a hypocycloidal drive, or for a generator apparatus incorporating such an engine, is limited only by the following claims.

We claim:

1. A method of operating an opposed-piston engine by coupling the connecting rods of a pair of opposed pistons to respective hypocycloidal drives, reciprocating the connecting rods along respective straight-line paths, and generating a sinusoidal voltage in response to straight-line reciprocating movement of at least one connecting rod.

2. The method of operating an opposed-piston engine of claim 1, in which a sinusoidal period is imposed on the straight-line reciprocating movement of the at least one connecting rod.

3. The method of operating an opposed-piston engine of claim 1, in which generating a sinusoidal voltage in response to straight-line reciprocating movement of at least one connecting rod includes generating the sinusoidal voltage in a coil mounted to the piston coupled to the connecting rod.

4. The method of operating an opposed-piston engine of claim 1 further by delivering liquid coolant through channels inside the connecting rods to back surfaces of crowns of the piston crowns.

5. The method of operating an opposed-piston engine of claim 4, in which generating a sinusoidal voltage in response to straight-line reciprocating movement of at least one connecting rod includes generating the sinusoidal voltage in a coil mounted to the piston coupled to the connecting rod.

6. An internal combustion engine for generating electricity with a hypocycloidal drive and a cylinder having at least one piston, a connecting rod coupling the hypocycloidal drive to the piston such that the hypocycloidal drive causes straight-line linear motion of the piston and the connecting rod, and an electrical generator associated with the piston to generate electricity in response to the straight-line linear motion of the piston and the connecting rod.

7. The internal combustion engine of claim 6, wherein the internal combustion engine has at least two hypocycloidal drives and the cylinder has a pair of opposed pistons, a respective connecting rod couples each hypocycloidal drive to a respective piston such that the hypocycloidal drive causes straight-line linear motion of the piston and the connecting rod and, an electrical generator associated with each piston generates electricity in response to the straight-line linear motion of the piston and the connecting rod.

8. The internal combustion engine of claim 7, wherein each hypocycloidal drive includes a ring gear having a pitch diameter D, a pinion with a pitch diameter d engaging the ring gear, wherein D=2d, a first journal connected to a point on the pitch diameter d on a first side of the pinion, the first journal rotatably coupled to a connecting rod, and a second journal eccentrically and rotatably mounted on a second side of the pinion.

9. The internal combustion engine of claim 7, wherein each connecting rod has a liquid coolant delivery channel to a back surface of a piston crown.

10. The internal combustion engine of claim 6, wherein the generator has a permanent magnet mounted to the cylinder and a coil mounted to the piston.

11. A generating apparatus with an opposed piston internal-combustion engine having a piston and a connecting rod connected to a hypocycloidal drive that causes straight-line linear motion of the piston and connecting rod, and at least one alternator coupled to the hypocycloidal drive.

12. The generating apparatus of claim 11, wherein the internal combustion engine has at least two hypocycloidal drives and a pair of opposed pistons, and a respective connecting rod couples each hypocycloidal drive to a respective piston such that the hypocycloidal drive causes straight-line linear motion of the piston and the connecting rod.

13. The generating apparatus of claim 12, wherein each hypocycloidal drive includes a ring gear having a pitch diameter D, a pinion with a pitch diameter d engaging the ring gear, wherein D=2d, a first journal connected to a point on the pitch diameter d on a first side of the pinion, the first journal rotatably coupled to a connecting rod, and a second journal eccentrically and rotatably mounted on a second side of the pinion.

14. The generating apparatus of claim 13, wherein each connecting rod has a liquid coolant delivery channel to a back surface of a piston crown.

15. The generating apparatus of claim 11 with an alternator coupled to each hypocycloidal drive.

16. The generating apparatus of claim 11, wherein the connecting rod has a liquid coolant delivery channel to a back surface of the crown of the piston.

* * * * *